United States Patent
Lee et al.

(10) Patent No.: US 9,817,800 B2
(45) Date of Patent: Nov. 14, 2017

(54) METHOD AND APPARATUS FOR REDUCING PAGE LOAD TIME IN COMMUNICATION SYSTEM

(71) Applicant: Samsung Electronics Co., Ltd., Suwon-si (KR)

(72) Inventors: Jicheol Lee, Suwon-si (KR); Jungshin Park, Seoul (KR); Beomsik Bae, Suwon-si (KR); Antony Franklin, Suwon-si (KR); Hanna Lim, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 178 days.

(21) Appl. No.: 14/835,426

(22) Filed: Aug. 25, 2015

(65) Prior Publication Data

US 2016/0055135 A1 Feb. 25, 2016

(30) Foreign Application Priority Data

Aug. 25, 2014 (KR) ........................ 10-2014-0110933

(51) Int. Cl.
*G06F 17/22* (2006.01)
*G06F 17/27* (2006.01)
*G06F 17/30* (2006.01)

(52) U.S. Cl.
CPC ........ *G06F 17/2247* (2013.01); *G06F 17/272* (2013.01); *G06F 17/30902* (2013.01)

(58) Field of Classification Search
CPC ................................ G06F 17/30899–17/30905
See application file for complete search history.

(56) References Cited

U.S. PATENT DOCUMENTS 6,182,122 B1 1/2001 Berstis
6,553,393 B1 * 4/2003 Eilbott ................ G06F 17/2205
707/E17.12

(Continued)

FOREIGN PATENT DOCUMENTS

WO 2005-106710 11/2005

OTHER PUBLICATIONS

Wang, et al., How Far Can Client-Only Solutions Go for Mobile Browser Speed?, Technical Report TR1215-2011, Rice University and Texas Instruments, 2012.

(Continued)

*Primary Examiner* — Asher Kells
(74) *Attorney, Agent, or Firm* — McAndrews, Held & Malloy, Ltd.

(57) ABSTRACT

The present disclosure relates to a pre-5th-Generation (5G) or 5G communication system to be provided for supporting higher data rates Beyond 4th-Generation (4G) communication system such as Long Term Evolution (LTE). Provided are a method and apparatus for reducing the page load time in a wireless communication system. The method for page loading in a mobile terminal may include: selecting, when a page is visited, a candidate page to be pre-inspected with respect to the page; performing pre-inspection of the candidate page and determining types of objects associated with the candidate page; generating tree information for the candidate page based on a result of the determination; and computing the loading time of the candidate page based on the tree information and determining download priorities of objects that are to be downloaded when the candidate page is visited.

14 Claims, 12 Drawing Sheets

(56) References Cited

U.S. PATENT DOCUMENTS

| | | | |
|---|---|---|---|
| 7,421,432 B1 | 9/2008 | Hoelzle et al. | |
| 7,565,423 B1 | 7/2009 | Fredricksen | |
| 7,600,028 B2 | 10/2009 | Eriksen | |
| 7,908,336 B2 | 3/2011 | Carlson et al. | |
| 8,341,245 B1 | 12/2012 | Roskind et al. | |
| 8,745,212 B2 | 6/2014 | Jain et al. | |
| 8,826,153 B2 | 9/2014 | Roskind et al. | |
| 9,678,928 B1* | 6/2017 | Tung | G06F 17/2247 |
| 2002/0078165 A1 | 6/2002 | Genty et al. | |
| 2002/0143896 A1* | 10/2002 | Hansmann | G06F 17/30902 709/218 |
| 2013/0124621 A1 | 5/2013 | Lepeska et al. | |
| 2013/0167004 A1* | 6/2013 | Goldman | G06F 17/2247 715/234 |
| 2015/0120858 A1* | 4/2015 | Anderson | G06F 17/2247 709/213 |
| 2015/0121198 A1* | 4/2015 | Simonsen | G06F 17/30902 715/236 |
| 2016/0261714 A1* | 9/2016 | Yang | G06F 13/385 |
| 2017/0011133 A1* | 1/2017 | Shalunov | G06F 17/30902 |

OTHER PUBLICATIONS

Khemmarat, et al., Watching User Generated Videos with Prefetching, MMSys'11, Feb. 23-25, 2011.

Kroeger, et al., Exploring the Bounds of Web Latency Reduction from Caching and Prefetching, Proceeding of the USENIX Synposium on Internet Technologies and Systems, 1997.

Wang, et al, Why are Web Browsers Slow on Smartphones?, HotMobile'11, Mar. 1-2, 2011.

Huang, et al., Anatomizing Application Performance Differences on Smartphones, MobiSys'10, Jun. 15-18, 2010.

Huang et al, A Close Examination of Performance and Power Characteristics of 4G LTE Networks, Mobisys'12, 2012.

"An Empirical Study on the Capacity and Performance of 3G Networks," Wee Lum Tan et al, IEEE Transactions on Mobile Computing, vol. 7. No. 6, Jun. 2008.

Chrome Networking: DNS Prefetch & TCP Preconnect(http://www.igvita.com/2012/06/04/chrome-networking-dns-prefetch-and-tcp-preconnect/).

"Chrome, like other Google Apps, requires licensing for Android 4.4" (http://androidcommunity.com/chrome-like-other-google-apps-requires-licensing-for-android-4-4-20131121/), Nov. 21, 2013.

"Mozilla and Samsung Collaborate on Next Generation Web Browser Engine" (https://blog.mozilla.org/blog/2013/04/03/mozilla-and-samsung-collaborate-on-next-generation-web-browser-engine/), Apr. 3, 2013.

* cited by examiner

METHOD AND APPARATUS FOR REDUCING PAGE LOAD TIME IN COMMUNICATION SYSTEM

CROSS-REFERENCE TO RELATED APPLICATION

This application claims priority from and the benefit under 35 U.S.C. §119(a) of Korean Patent Application No. 10-2014-0110933, filed on Aug. 25, 2014, which is hereby incorporated by reference for all purposes as if fully set forth herein.

BACKGROUND

The present disclosure relates to a communication system. More particularly, the present disclosure relates to a method and apparatus for reducing the page load time in a communication system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Typical mobile communication systems have been developed to provide voice services while allowing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

In recent years, wireless network technologies have been combined with IP networks and smartphones have been rapidly popularized. As such, users may use web browsers to access information such as video content on the Internet. As shown in FIG. 1, when users use web browsers running on smartphones to access webpages of various websites on the Internet, the page load time tends to be greater than or equal to one second, over 90% of the time.

The webpage load time directly affects user experience, and the short load time leads to greater user satisfaction. The page load time is one of the most important performance factors for user equipment or terminals.

Hence, it is necessary to develop a scheme that can reduce the load time of webpages in a wireless communication system.

SUMMARY

Aspects of the present disclosure are intended to address at least the above mentioned problems and/or disadvantages and to provide at least the advantages described below. Accordingly, an aspect of the present disclosure is to provide a method and apparatus for reducing the page load time in a wireless communication system.

More specifically, an aspect of the present disclosure is to provide a method and apparatus that can reduce the page load time in a wireless communication system by computing page load times of objects associated with a webpage to be visited next and requesting those objects with long page load times first when the webpage is visited.

In accordance with an aspect of the present disclosure, a method for page loading in a mobile terminal is provided. The method may include: selecting, when a page is visited, a candidate page to be pre-inspected with respect to the page; performing pre-inspection of the candidate page and determining types of objects associated with the candidate page; generating tree information for the candidate page based on a result of the determination; and computing the loading time of the candidate page based on the tree information and determining download priorities of objects that are to be downloaded when the candidate page is visited.

In accordance with another aspect of the present disclosure, a method for page loading in a mobile terminal is provided. The method may include: checking, when a page is visited, whether a record of a previous visit to the page is present; identifying, when a record of a previous visit to the page is present, Round Trip Time (RTT) information of the page; determining a download sequence for objects associated with the page based on the RTT information; and loading the page by downloading the associated objects according to the determined download sequence.

In accordance with another aspect of the present disclosure, a mobile terminal for loading pages is provided. The mobile terminal may include: an interface unit to access a page and to send and receive signals to and from the page; and a pre-inspector to perform a process of selecting, when a page is visited, a candidate page to be pre-inspected with respect to the page, performing pre-inspection of the candidate page and determining types of objects associated with the candidate page, generating tree information for the candidate page based on the determination result, and computing the loading time of the candidate page based on the tree information and determining download priorities of objects that are to be downloaded when the candidate page is visited.

In accordance with another aspect of the present disclosure, a mobile terminal for loading pages is provided. The mobile terminal may include: an interface unit to access a page and to send and receive signals to and from the page; and a pre-inspector to control a process of checking, when a page is visited, whether a record of a previous visit to the page is present, identifying, when a record of a previous visit to the page is present, Round Trip Time (RTT) information of the page, determining a download sequence for objects associated with the page based on the RTT information, and loading the page by downloading the associated objects according to the determined download sequence.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
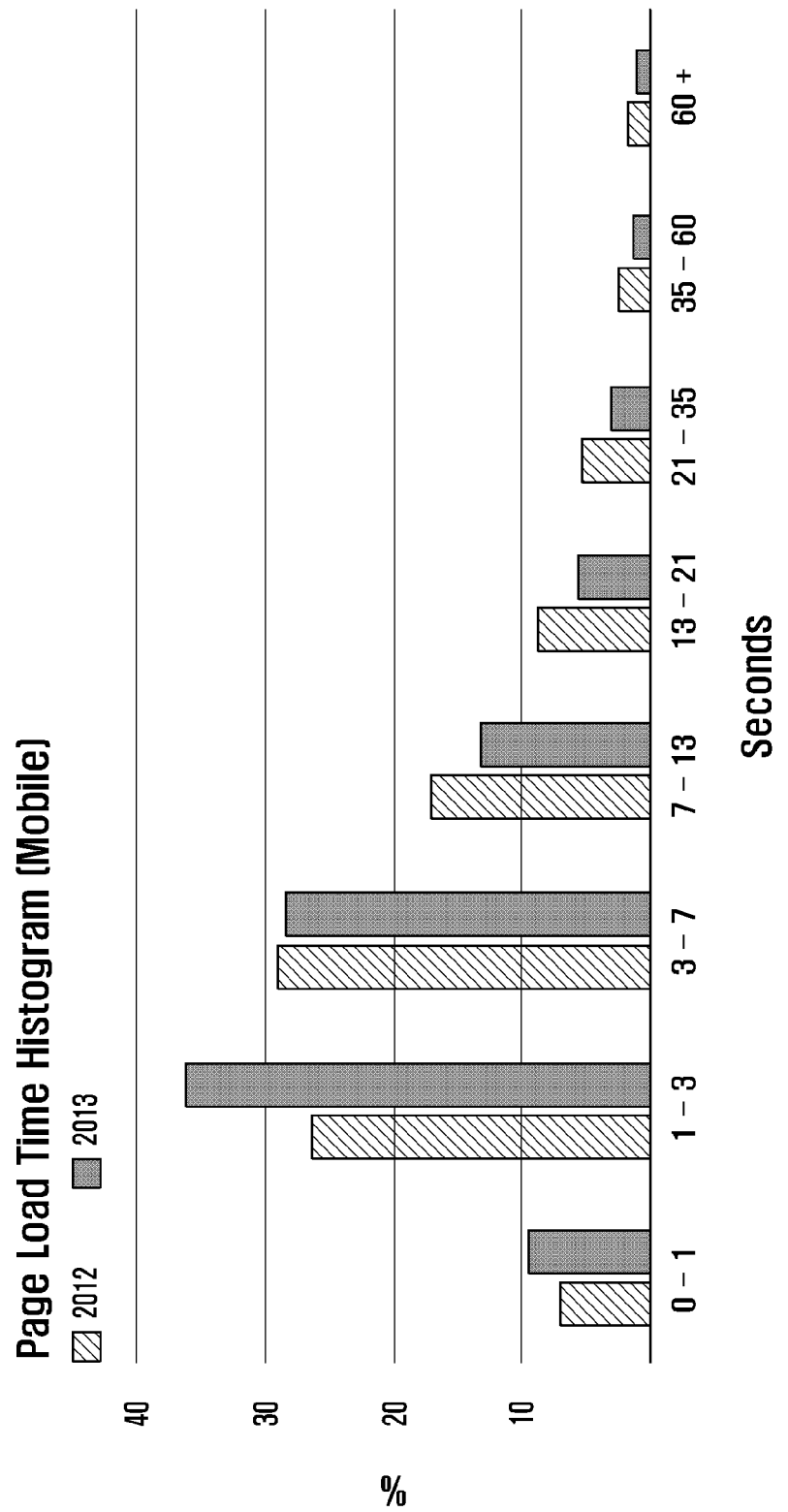
FIG. 1 illustrates a distribution of page loading times for websites on the Internet.

Hereinafter, preferred embodiments of the present disclosure are described in detail with reference to the accompanying drawings. The same or similar reference symbols are used throughout the drawings to refer to the same or like parts. Descriptions of well-known functions and constructions may be omitted for clarity and conciseness.

Descriptions of well-known functions and structures incorporated herein may be omitted to avoid obscuring the subject matter of the present disclosure. Descriptions of components having substantially the same configurations and functions may also be omitted.

In the drawings, some elements are exaggerated or only outlined in brief, and thus may be not drawn to scale. The present disclosure is not limited by relative sizes of objects and intervals between objects in the drawings.

The aspects, features and advantages of certain embodiments of the present disclosure will be more apparent from the following detailed description taken in conjunction with the accompanying drawings. The description of the various embodiments is to be construed as exemplary only and does not describe every possible instance of the present disclosure. It should be apparent to those skilled in the art that the following description of various embodiments of the present disclosure is provided for illustration purpose only and not for the purpose of limiting the present disclosure as defined by the appended claims and their equivalents.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as a field-programmable gate array (FPGA) or application-specific integrated circuit (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

The size of a webpage and the number of objects in a webpage have constantly increased since the introduction of the Web. Recently, it is estimated that the average size of a webpage is 1 Mbyte and a webpage contains 80 objects on average.

Recently however, both the size of a webpage and the number of objects have sharply increased. In the near future, it is expected that the average size of a webpage will reach 3 Mbytes and that a webpage will contain 240 objects on average.

Hereinafter, a description is given of a method for reducing the page load time in a mobile terminal such as a smartphone connected to the Internet according to various embodiments of the present disclosure.

Figure 2:
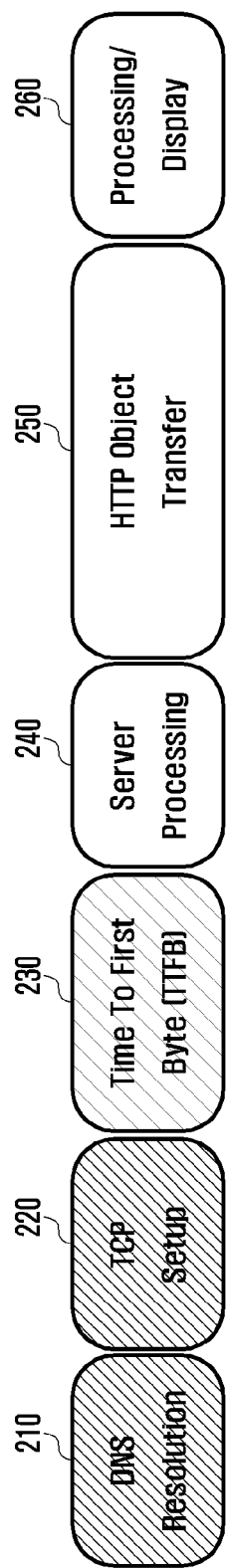
FIG. 2 illustrates a series of steps for delivering web content on the Internet to a browser of the user.

FIG. 2 illustrates a series of steps for delivering web content on the Internet to a browser of the user.

To deliver web content on the Internet to a browser of a user, the browser on a mobile terminal obtains an IP address corresponding to a URL through a Domain Name System (DNS) protocol (210).

The browser establishes a Transmission Control Protocol (TCP) connection to a web server indicated by the Internet Protocol (IP) address and receives a webpage from the web server by use of the Hypertext Transfer Protocol (HTTP) protocol. Specifically, after setup a TCP connection (220), the browser receives HTTP objects (250) from the server as a result of server processing (240) after passage of Time to First Byte (TTFB) (230, the time from creation of an HTTP request to reception of the first byte of a page received by the browser) and displays the received web objects on the screen (260).

In this case, one webpage is composed of multiple web objects and the URL of the browser indicates the first web object.

The first web object includes a HyperText Markup Language (HTML) file usually referred to as index.html, and this index.html file may include multiple web objects or resources having different URLs. Such web objects may be style sheets, images, videos, HTML codes or JavaScript codes.

According to recent webpage statistics, to load one page, a browser makes 90 web requests to 15 servers on average. As shown in Table 1 below, a webpage is composed, on average, of 10 HTML objects, 55 images, 15 JavaScript objects, and 5 Cascading Style Sheets (CSS) objects. Here, a CSS object may be a document specifying the background, font and background image of a webpage.

TABLE 1

| Web objects | Number of requests | Size |
| --- | --- | --- |
| HTML | 10 requests | 52 KB |
| Images | 55 requests | 812 KB |
| Javascript | 15 requests | 216 KB |
| CSS | 5 requests | 36 KB |
| Other | 5 requests | 195 KB |
| Total (Page) | 90 requests | 1,311 KB |

A web object may be connected with another web object through a link. That is, a web object may refer to another web object through associations between web objects. When a link is found in an object, the browser makes a request to the object.

Factors affecting the page load time include the time for network signaling and web object transfer (250), the time for displaying web objects on the screen in the browser (260), and the server processing time (240).

Figure 3:
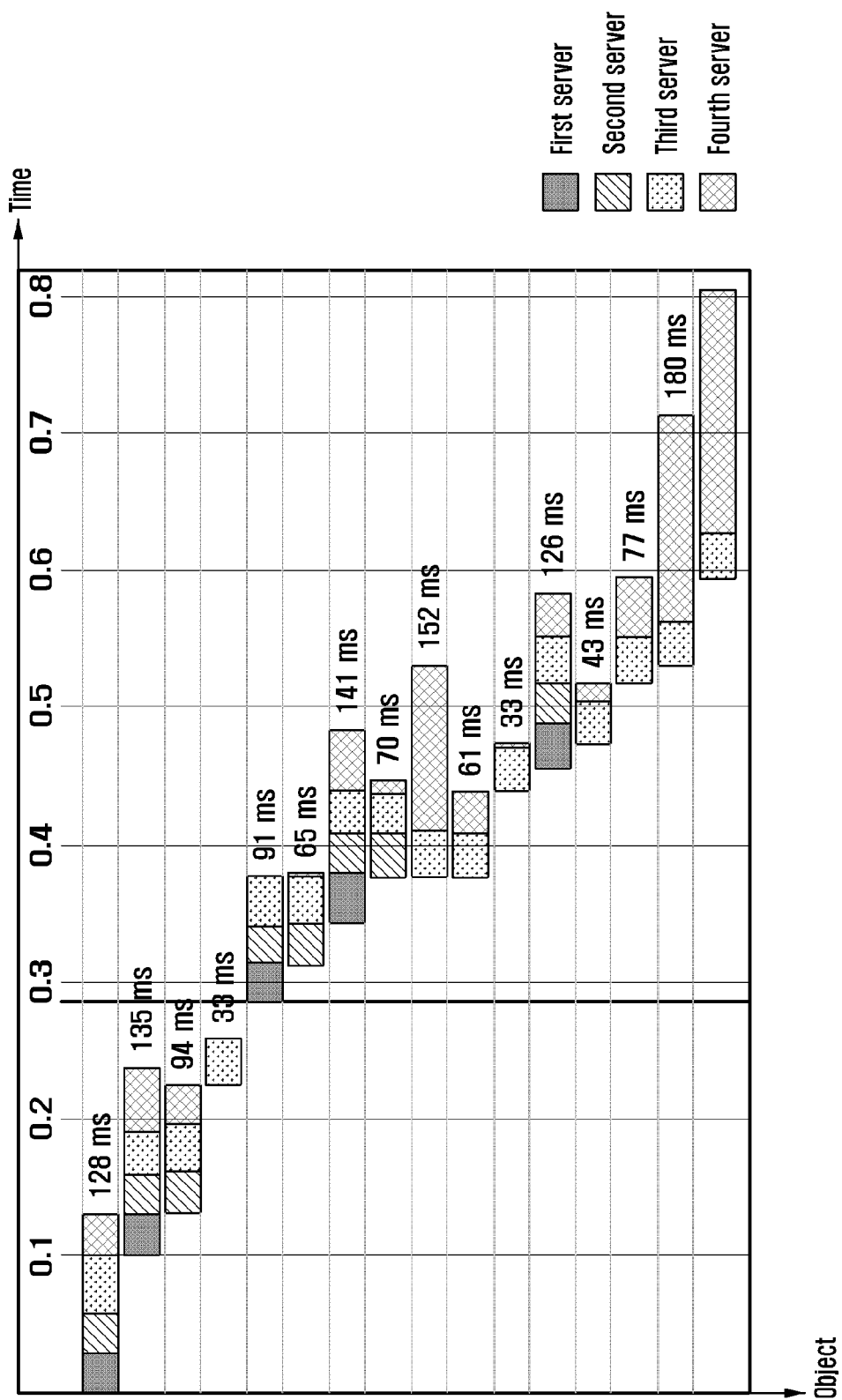
FIG. 3 depicts an analysis of the page load time for a webpage.

FIG. 3 depicts an analysis of a page load time for a webpage in consideration of the associations described above. It can be seen from FIG. 3 that the browser takes about 0.8 seconds to load the first page from "m.naver.co.kr" by accessing 5 servers and downloading 16 objects.

Since the webpage load time directly affects user experience and is a performance factor for user terminals as described before, it is necessary to develop a scheme to reduce the webpage load time.

Next, a description is given of a scheme to reduce a webpage load time while minimizing usage of bandwidths according to embodiments of the present disclosure.

Figure 4:
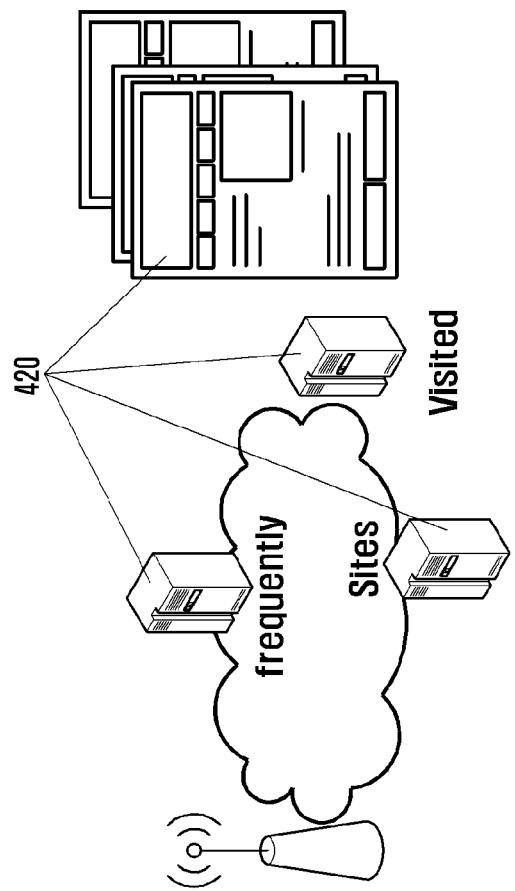
FIG. 4 illustrates a wireless network architecture according to an embodiment of the present disclosure.
Figure 4:
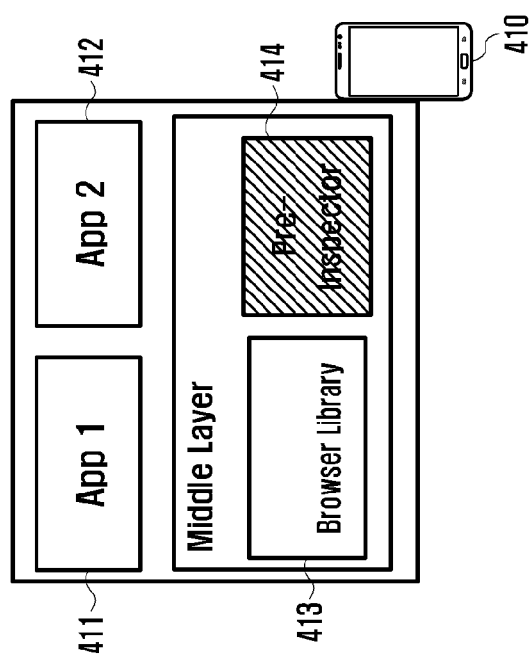

FIG. 4 illustrates a wireless network architecture according to an embodiment of the present disclosure.

As shown in FIG. 4, a mobile terminal 410 connected to a wireless network and at least one web server 420 may be included in the present disclosure. The web server 420 may be a web server registered as a frequently visited site.

The mobile terminal 410 may include one or more applications 411 and 412 utilizing a middle layer of an operating system, a browser library 413 providing browser window functions, and a pre-inspector 414 realizing the algorithm proposed as an embodiment of the present disclosure.

A webpage is content whose location is identified by a Uniform Resource Locator (URL). Such a webpage is presented to the user through the HTTP protocol connecting a client and a server on an IP network. HTTP is a protocol whereby a web object is requested and downloaded. Here, the web object may be automatically created by using information stored in a server or database or by using multiple pieces of information received from different servers.

The web server 420 may be a web application server capable of automatically creating HTTP responses. The web server 420 may send a package of content as an HTTP response to a client.

The web server 420 may provide documents written in the Hypertext Markup Language (HTML) or an extended markup language, videos, images, and multimedia content or a combination thereof.

In one embodiment, when the user of the mobile terminal 410 reads a webpage during Internet browsing at the middle layer, the pre-inspector 414 analyzes a current page to identify pages that are highly likely to be visited next by the user.

For each page that is highly likely to be visited next, to load the next page, the pre-inspector 414 downloads in advance the top level metadata file having URLs of web objects (resources) such as "index.html".

The pre-inspector 414 downloads top level web objects, web objects (resources) referenced by the top level web objects, and metadata thereon in advance. The pre-inspector 414 estimates loading times of the webpages that are highly likely to be visited next based on the information downloaded in advance.

In the present embodiment, the page load time can be reduced by pre-fetching web resources based on the estimation results when one of the webpages whose loading times are estimated is actually visited.

The features of the present disclosure may be summarized as follows. The pre-inspector differs in two aspects from the technique used by an existing browser (e.g. pre-fetching).

First, the pre-inspector 414 at the client (e.g., the mobile terminal 410) fetches the top-level page to be visited next without the help of a server.

Existing browsers perform pre-fetching based on tags added by the server to the metadata file like index.html for web resources using statistical information.

The pre-inspector 414 of the present disclosure may analyze the current page read by the user and identify pages that are likely to be visited next in the absence of tags attached by the server. The pre-inspector may determine pages to be pre-inspected among the pages identified as being likely to be visited next based on information stored in the mobile terminal such as usage histories, user interactions and consumption of network and terminal resources, and inspect the determined pages in advance.

Second, the pre-inspector of the present disclosure not only downloads the top-level file of the page to be visited next but also pre-inspects web resources associated with the top-level file via links. Hence, the pre-inspector creates a page tree to estimate the page load time.

This is different from pre-fetching of the top-level URL of the next page or from pre-rendering which involves pre-fetching of all resources of the next page and screen composition.

The second feature of page tree enables identification of web resources significantly affecting the page load time of a pre-fetched page. Hence, when a page is actually visited, the mobile terminal may preoccupy web resources identified through the pre-inspector, decreasing the page load time with reduced bandwidth consumption.

Another feature of the present disclosure is that the pre-inspector 414 may be implemented as a part of a browser or be implemented independently of a browser. When the pre-inspector 414 is implemented as an independent entity, it may be commonly used by multiple browsers. This is described in detail with reference to FIG. 5.

Figure 5:
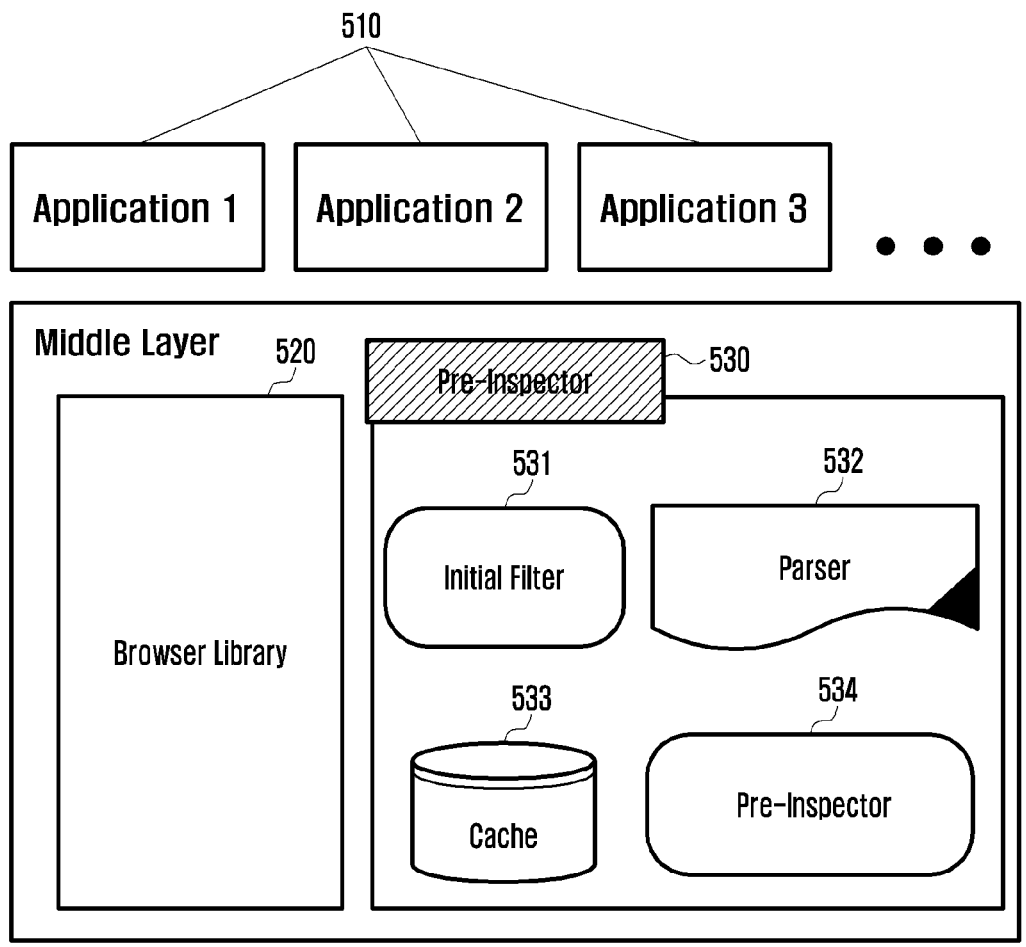
FIG. 5 illustrates an internal structure of a mobile terminal according to an embodiment of the present disclosure.

FIG. 5 illustrates an internal structure of a mobile terminal according to an embodiment of the present disclosure.

As shown in FIG. 5, the mobile terminal may include one or more applications 510 using functions of the middle layer of the operating system.

The mobile terminal may further include a browser library 520 providing browser window functions.

The mobile terminal may further include a pre-inspection unit 530 to pre-inspect candidate pages with respect to the currently displayed page.

The pre-inspection unit 530 may include an initial filter 531 to identify targets to be pre-inspected, a parser 532 to parse a given sentence through syntax analysis and error correction, a cache 533 to store information on visited webpages for a preset time, and a pre-inspector 534 to pre-inspect candidate pages with respect to the currently displayed page.

In particular, the pre-inspection unit 530 may perform pre-inspection of candidate pages, identify types of objects associated with the candidate pages, and generate tree information for the candidate pages based on the identification results. For each candidate page, the pre-inspection unit 530 may estimate the loading time of a candidate page based on the tree information and determine priorities of objects to be downloaded when the candidate page is visited. Here, the objects may be at least one of an HTML object, image, JavaScript object, and CSS object.

When an object is of type 1, the pre-inspection unit 530 may send an HTTP GET request for the object to download the object. When an object is of type 2, the pre-inspection unit 530 may send an HTTP HEAD request for the object to receive size information of the object.

Figure 6:
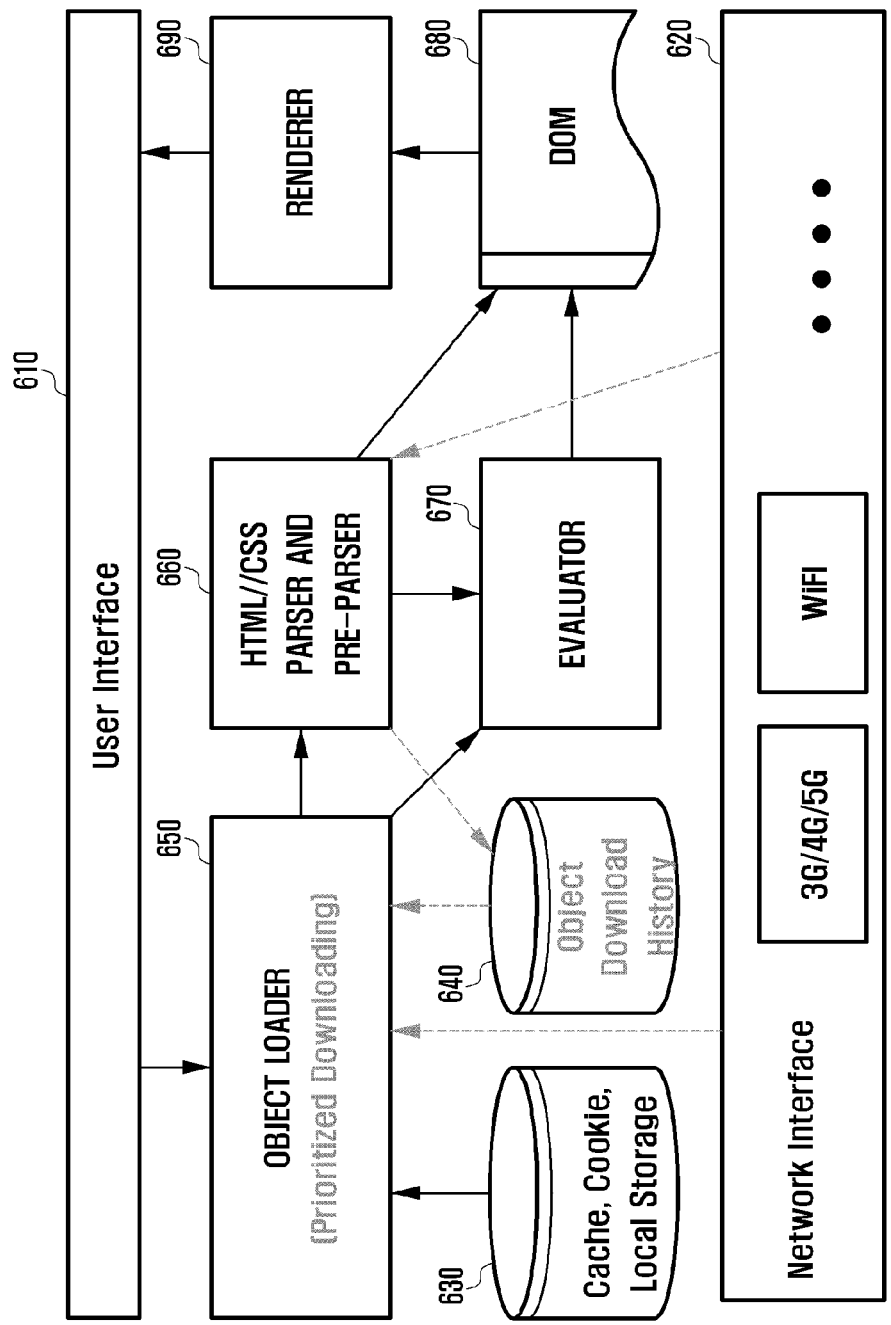
FIG. 6 illustrates an internal structure of a mobile terminal according to another embodiment of the present disclosure.

FIG. 6 illustrates an internal structure of a mobile terminal according to another embodiment of the present disclosure. More specifically, FIG. 6 illustrates a browser structure for reducing the page load time based on object download histories.

As shown in FIG. 6, the mobile terminal may receive an input event for accessing a desired webpage through a user interface 610. Thereafter, the mobile terminal may download objects associated with the webpage through a network interface 620.

In this case, the mobile terminal may determine download priorities of a plurality of objects at object loader 650 based on cache, cookies and local storage 630 and object download histories 640. For example, an object with a large size or long download delay may be downloaded first.

When an object is downloaded, the mobile terminal may parse, or pre-parse the object according to HTML or CSS with parser 660. The parsed object is evaluated, or pre-evaluated at Evaluator 670, processed according to a Document Object Model (DOM) 680, and rendered at renderer 690.

A result of the rendering may be presented to the user via the user interface 610.

Figure 7:
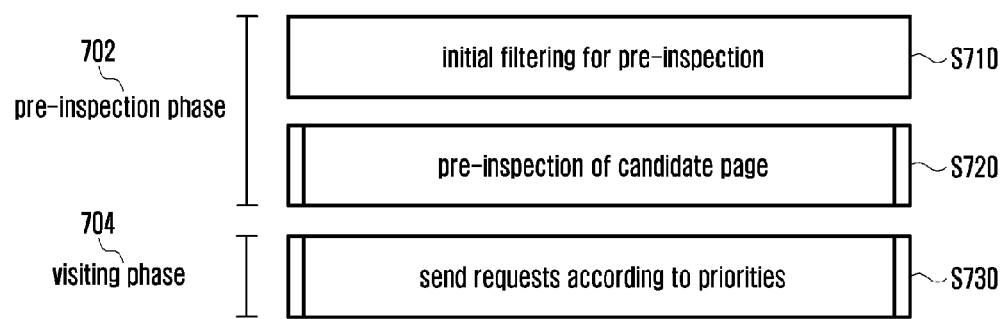
FIG. 7 is a flowchart of a procedure for pre-inspection according to an embodiment of the present disclosure.

FIG. 7 is a flowchart of a procedure for pre-inspection according to an embodiment of the present disclosure.

The pre-inspection procedure may be include a pre-inspection phase 702 performed when a page visited by a pre-inspector (e.g., the pre-inspector 530 of FIG. 5) is displayed and read by the user, and a visiting phase 704 performed when a pre-inspected page is visited by the user.

Next, a description is given of the pre-inspection phase 702 and visiting phase 704 with reference to the flowchart of FIG. 7.

At step S710, the pre-inspection procedure performs initial filtering. When a webpage is downloaded in the pre-inspection phase 702, the pre-inspector applies initial filtering to visitable links attached to the webpage to identify targets for pre-inspection.

The information used for initial filtering may include at least one of usage histories, user interactions, and required terminal resources. For example, an amount of memory, an amount of CPU load, an amount of battery power, an amount of remaining battery power, an amount of network resources, information on a currently connected network, an amount of traffic on a current network, billing information for a current network, and billing information of a domain or site for pre-fetching or pre-inspection may be utilized.

Figure 8:
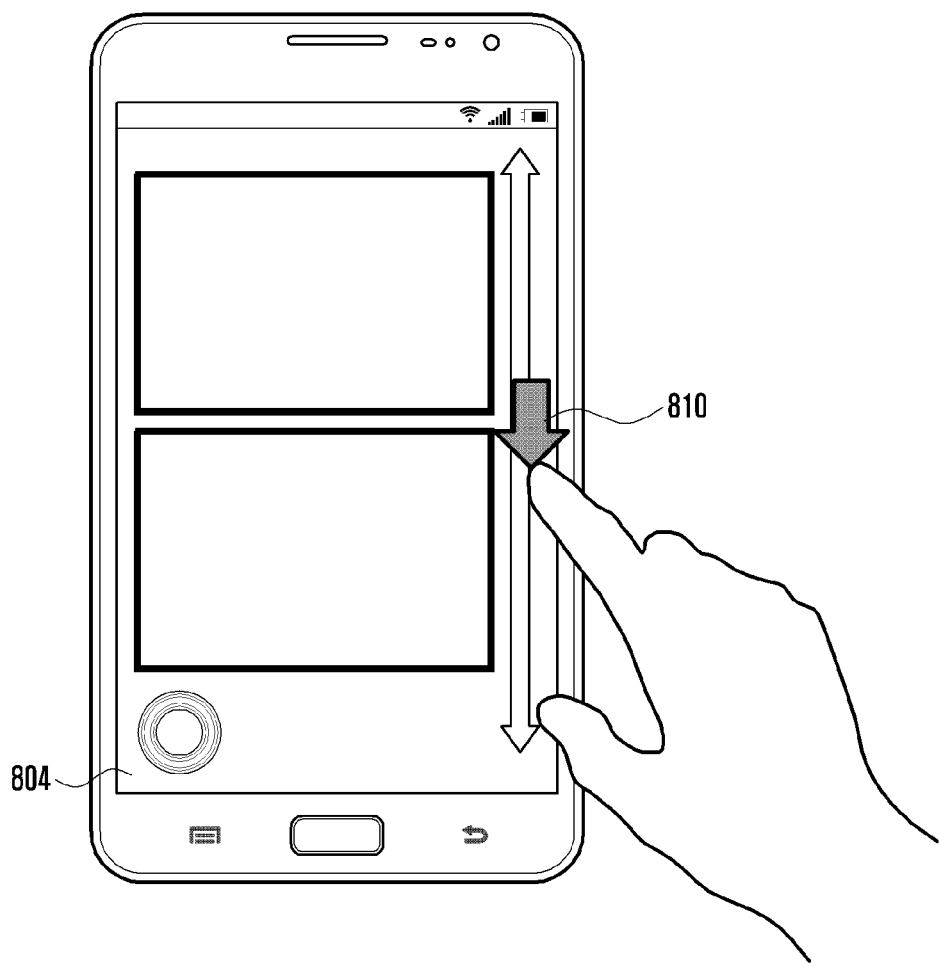
FIG. 8 illustrates a scrolling action on the screen of the mobile terminal.

The usage history may include a list of sites recently visited by the user. User interactions such as scrolling may be dynamically used for initial filtering. For example, as shown in FIG. 8, when the user performs downward scrolling to view a page in a lower region of a screen 804, the pre-inspector may select the page in the lower region as a candidate page for pre-inspection in accordance with a scrolling direction.

When a wireless LAN (WLAN) network resource, for example, Wi-Fi is activated on a mobile terminal, a Wi-Fi connection may be used for selecting a candidate page for pre-inspection. Sponsored connectivity may also be used for selecting a candidate page for pre-inspection.

Identification of a target for pre-inspection may be initiated based on not only examination of an HTML file at the time of page loading but also occurrence of a dynamic event. Examples of a dynamic event may include a Wi-Fi enabling event, reception of an indication to network overhead change, and exposure of a pre-inspection target to the user due to webpage scrolling.

Referring back to FIG. 7, after initial filtering for pre-inspection at step S710, the pre-inspector performs pre-inspection of candidate pages at step S720. Pre-inspection of candidate pages is descried in detail with reference to FIG. 9.

Figure 9:
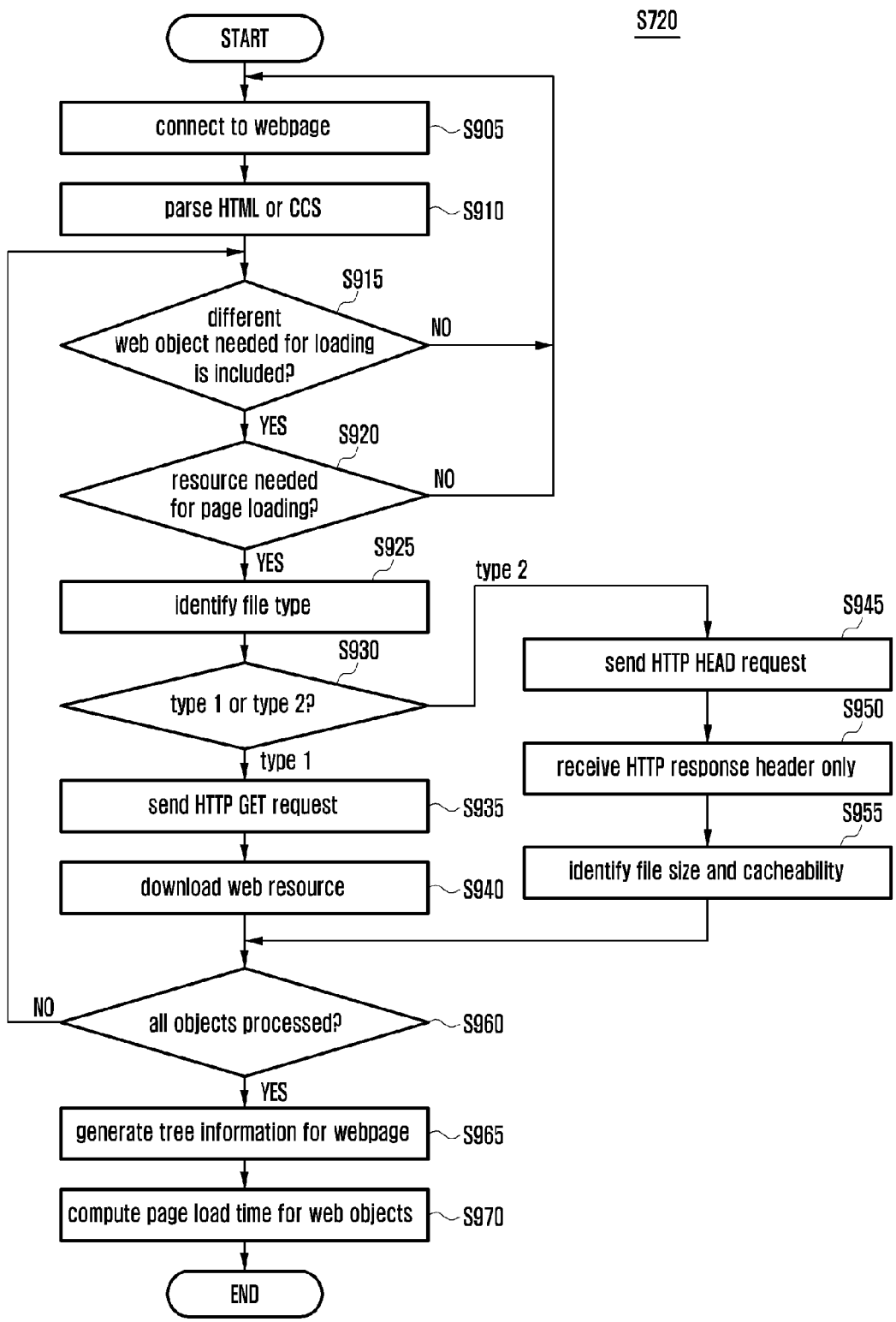
FIG. 9 is a detailed flowchart for a pre-inspection step S720 according to an embodiment of the present disclosure.

FIG. 9 is a detailed flowchart for pre-inspection (step S720 of FIG. 7) according to an embodiment of the present disclosure.

At step S905, the pre-inspector detects access of the mobile terminal to a webpage. The pre-inspector performs pre-inspection of pages indicated by URLs in the webpage. Here, the target for pre-inspection may be an HTML document.

More specifically, at step S910, the pre-inspector (e.g., the parser 660 of FIG. 6) parses an HTML file or CSS file. At step S915, the pre-inspector examines whether a different web object needed to load the next page is included based on a result of the parsing.

If a different web object needed to load the next page is included, at step S920, the pre-inspector checks whether the object referenced by the top-level object is an object, or resource, is needed for page loading or is a URL associated with a different page. If the object is an object, or resource, needed for page loading, at step S925, the pre-inspector examines the file type associated with the URL reference.

At step S930, the pre-inspector checks whether the file type is type 1 or type 2. If the file type is type 1, the procedure proceeds to step S935; and if the file type is type 2, the procedure proceeds to step S945. Here, a CSS or HTML file is of type 1, and an image file is of type 2.

At step S935 (for type 1 file and not hidden), the pre-inspector sends an HTTP GET request to download a corresponding web object or resource. At step S940, the pre-inspector receives the corresponding web object or resource. Here, the web object may be a CSS or HTML file.

At step S945 (for type 2 file), the pre-inspector sends an HTTP HEAD request for the corresponding file. At step S950, the pre-inspector receives an HTTP response header (excluding file body). At step S955, the pre-inspector identifies the size and cacheability of the corresponding file.

Although not shown, when the file type is JavaScript, the pre-inspector may pre-execute the JavaScript or regard the same as leaf.

At step S960, the pre-inspector checks whether all the objects in the webpage have been processed.

If not all the objects have been processed, the procedure returns to step S915 and the pre-inspector repeats the subsequent steps.

If all the objects have been processed, at step S965, the pre-inspector composes tree information for candidate pages with respect to the current webpage. Tree information is illustrated in FIG. 10.

Figure 10:
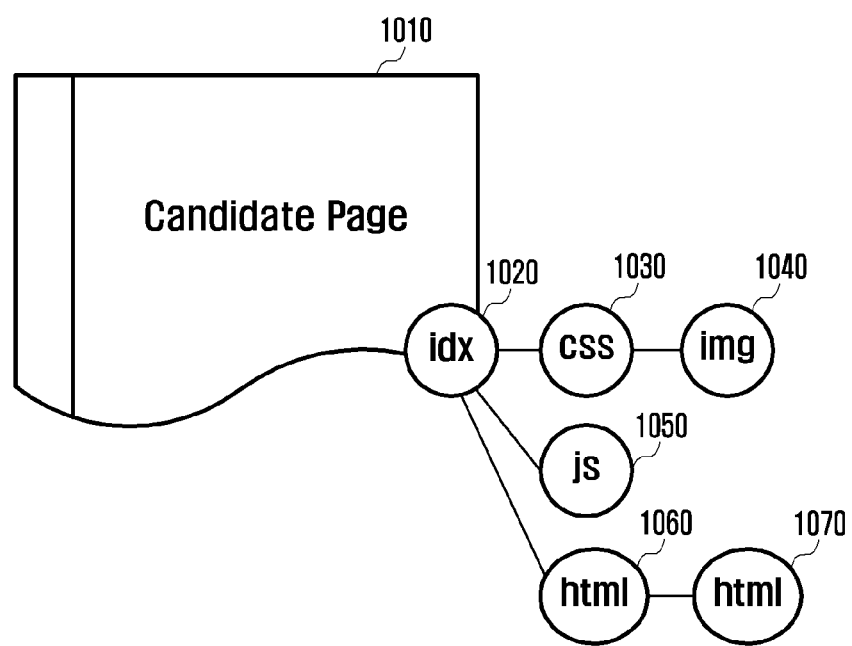
FIG. 10 illustrates tree information for a candidate page according to an embodiment of the present disclosure.

FIG. 10 illustrates tree information for a candidate page according to an embodiment of the present disclosure.

As shown in FIG. 10, the tree information for a candidate page is configured as a tree of multiple objects with index information (idx) 1020 as the root. For example, while pre-inspecting a CSS file 1030, the pre-inspector may find an image file (img) 1040 referenced by the CSS file 1030. Then, the pre-inspector may receive header information of the image file 1040 to identify the size of the image file (img) 1040.

Likewise, the pre-inspector may generate tree information for the candidate page 1010, which indicates that JavaScript (JS) file 1050 and HTML files 1060 and 1070 are associated with the candidate page 1010.

Referring back to FIG. 9, at step S970, the pre-inspector estimates the page load time for the candidate page based on the tree information.

In one embodiment, the page load time of a web object may be computed as follows. To compute the page load time, the following items may be considered.

1) A first object accessed by the browser (DNS resolution and TCP setup)
2) Size of a web object
3) Position of a referenced web object in an HTML or CSS file (ref_position)
4) Back reference to a web object referring to the target web object In consideration of the above parameters, the page load time for a web object may be estimated as follows. The following description illustrates computation of the page load time by use of numerical expressions considering the above parameters.

<Example for Computation of Page Load Time>
PLT1 (O1)=Tdns+Ttcp+T1
PLT2 (O2)=PLT1 (O1)+Ttcp+T2
PLT2 (Oi)=min PLT2(Oj)+Ti
PLT3 (Oi)=min PLT2(ROi), min PLT3 (Oi)+Ti A detailed description of the example is given below.

PLT1 (O1) indicates the time taken to receive Object 1.

Tdns indicates a time taken for a DNS query (i.e. a time from sending a request to a DNS server to receiving a corresponding response).

Ttcp indicates a time taken for TCP connection setup. That is, Ttcp indicates the time taken for TCP handshake involving transmission of a session setup request from a client to a server, transmission of a response from the server to the client, and transmission of an ACK from the client to the server.

T1 indicates a time taken to transfer Object 1 through a TCP connection. T1 increases with an increase of size of Object 1.

PLT2 (O2) indicates a time taken to download Object 2. Here, as Object 2 depends on Object 1 (i.e., dependency), and Object 2 can be received after reception of Object 1.

Hence, the time taken to download Object 2 may be computed by summing up the time taken for TCP connection setup to receive Object 2, the time taken to transfer Object 2 during a TCP session, and the time taken to receive Object 1.

PLT2 (Oi) indicates a time taken to download Object i. Specifically, PLT2 (Oi) indicates a time taken to transfer Object i using an empty slot during an existing TCP session.

PLT3 (Oi) indicates a time taken to download Object i. Specifically, PLT3 (Oi) indicates a sum of the time taken to receive objects referring to Object i and the time taken to receive Object i.

When the computed page load time is less than or equal to a preset threshold, the pre-inspector may attach a default optimization indication to the corresponding page having a distinct URL.

When the computed page load time is greater than the preset threshold, the pre-inspector may attach both a default optimization indication and a record of web objects significantly affecting the loading time to the corresponding page based on graph analysis. In addition, the pre-inspector may compute a number of resources to be downloaded in parallel so that a corresponding page can be received within a target page load time, and write the computed value in a meta-information of the corresponding page.

As described above, the pre-inspector may generate tree information for candidate pages with respect to the currently visited webpage and compute page load times for web objects based on the tree information. By use of the computed page load times, the pre-inspector may determine download priorities of web objects when a candidate page is actually visited. Here, download priorities may be determined so that objects with a large size or large download delay can be downloaded first. The pre-inspector may store the information on the download priorities as a priority list.

Referring back to FIG. 7, after completing pre-inspection of candidate pages, at step S730, the pre-inspector detects a visit to a specific candidate page and then controls the mobile terminal to send a download request for a web object according to the determined priority information. This is described in more detail with reference to FIG. 11.

Figure 11:
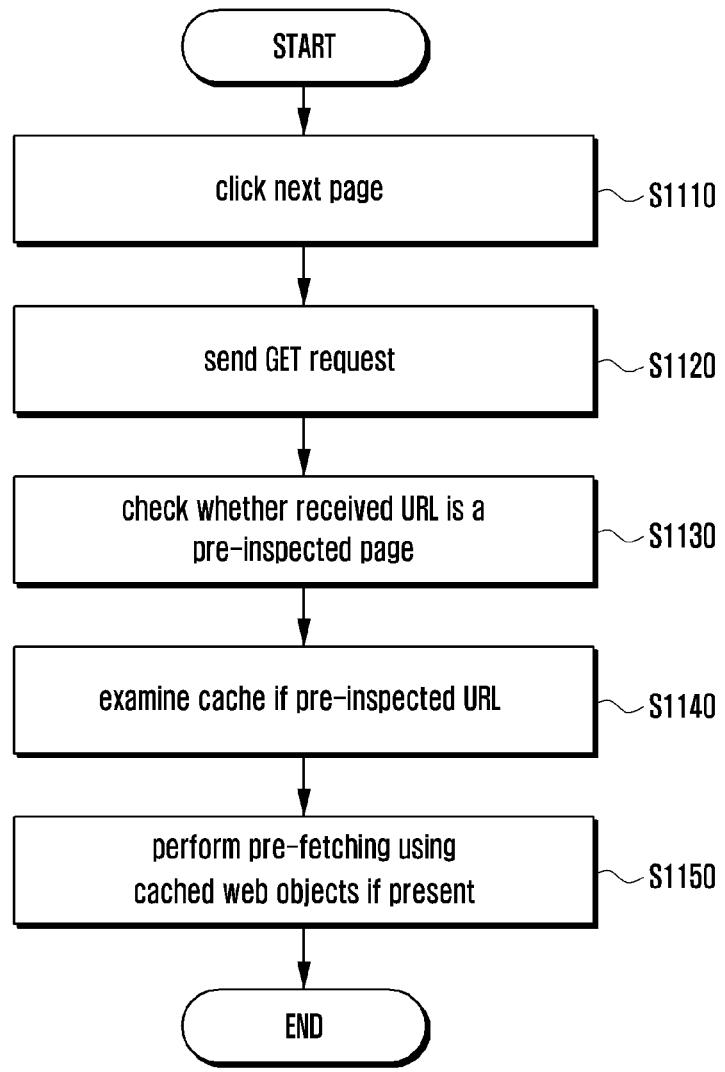
FIG. 11 is a flowchart depicting a series of operations performed when a candidate page is clicked according to an embodiment of the present disclosure.

FIG. 11 is a flowchart depicting a series of operations performed when a candidate page is clicked according to an embodiment of the present disclosure.

At step S1110, the mobile terminal detects an input event like click to enter the next page (e.g. candidate page) during display of a current page. At step S1120, the browser of the mobile terminal sends a GET request for a URL representing the next page.

At step S1130, the pre-inspector of the mobile terminal checks whether the received URL is associated with a pre-inspected page.

If the URL is a pre-inspected page, at step S1140, the pre-inspector checks whether web objects are stored in the cache for a cache hit. If web objects whose valid time is not expired are present in the cache, at step S1150, the pre-inspector parses the next webpage by use of the cached web objects.

On the other hand, if the URL is a pre-inspected page but no cached web object is present, the pre-inspector may identify objects for which a request is to be sent first based on the determined priority list. Thereafter, the pre-inspector may send a GET request for the identified objects associated with the URL according to the determined priorities.

In one embodiment, the pre-inspector may determine a candidate page to be visited next with respect to a webpage currently displayed on the mobile terminal. The pre-inspector may identify types of objects associated with the candidate page and generate tree information reflecting relationships between the objects. The pre-inspector may obtain information regarding file sizes and download delays of objects of a given type based on the tree information.

The pre-inspector may determine download priorities of objects that are to be downloaded first when the candidate page is actually visited by the mobile terminal based on the information on file sizes and delays. For example, the pre-inspector may assign high download priorities to objects with a large file size or large delay.

When the candidate page is visited, the pre-inspector may send download requests for objects associated with the page according to the assigned download priorities.

In another embodiment, for instance, when a page is visited, the mobile terminal may measure the Round Trip Time (RTT) and average download time of the page or web object and record the measurement results. For example, the mobile terminal may measure and record the RTT and average download time of the page or web object corresponding to a particular domain name.

Thereafter, when the page is revisited, the mobile terminal may determine download priorities of web objects based on the recorded information.

This embodiment is described in detail with reference to FIG. 12.

Figure 12:
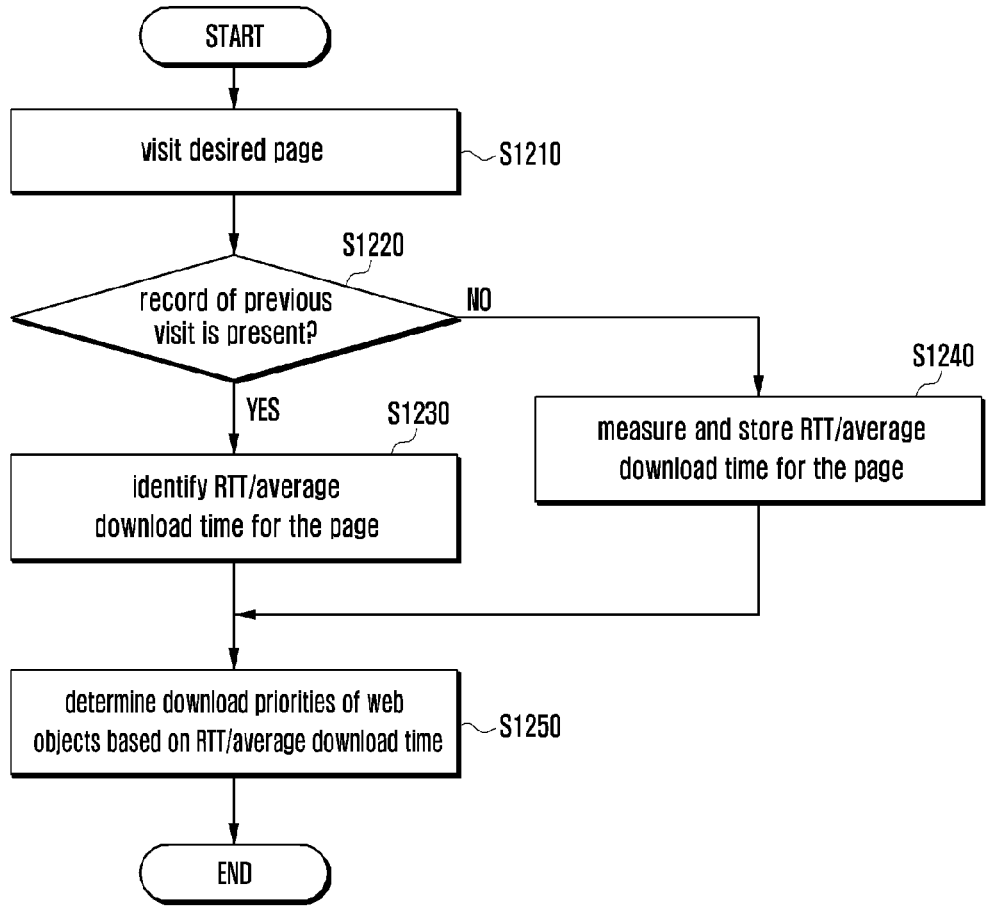
FIG. 12 is a flowchart of a procedure performed by the mobile terminal according to another embodiment of the present disclosure.

FIG. 12 is a flowchart of a procedure performed by the mobile terminal according to another embodiment of the present disclosure.

At step S1210, the mobile terminal (or pre-inspector) detects a visit to a webpage.

At step S1220, the mobile terminal checks whether a record of a previous visit to the webpage is present. If such a record is not present, at step S1240, the mobile terminal measures the RTT of the webpage and average download times of web objects in the webpage and stores a result of the measurement.

If such a record is present, at step S1230, the mobile terminal retrieves information regarding the RTT of the webpage and average download times of web objects in the webpage.

At step S1250, the mobile terminal determines download priorities of web objects in the visited webpage based on the information regarding RTT and average download times. For example, high download priorities may be assigned to objects with a large file size or large download delay.

In the above embodiment, the mobile terminal determines download priorities of web objects based on a history of visits to webpages. To this end, when the cache is replaced on a periodic or aperiodic basis, the mobile terminal may determine not to remove file size and RTT information related to a webpage visit history.

That is, the mobile terminal may examine the point in time for cache replacement. When it is time to perform cache replacement, the mobile terminal may check presence of RTT information of a webpage in the cache and remove contents of the cache except for the RTT information.

When a webpage is visited, the mobile terminal may store information regarding files with a high download priority, such as files whose size or download delay is greater than a threshold. Thereafter, when the webpage is revisited, the mobile terminal may determine the sequence of downloads for files based on the stored information.

According to embodiments of the present disclosure, when a webpage is visited, it is possible to obtain information regarding the size and download delay only for some objects without downloading all the objects. As shown in Table 2 below, on average, one webpage has a size of 1.3 MB, an HTML file has a size of 52 KB, and a CSS file has a size of 36 KB. The HTML file and CSS file take only six percent of the total size.

TABLE 2

| Web objects | Number of requests | Size |
| --- | --- | --- |
| HTML | 10 requests | 52 KB |
| Images | 55 requests | 812 KB |
| Javascript | 15 requests | 216 KB |
| CSS | 5 requests | 36 KB |
| Other | 5 requests | 195 KB |
| Total (Page) | 90 requests | 1,311 KB |

Hence, after size information of an image file is obtained during pre-inspection, downloading the image file at the time when the corresponding page is visited may further reduce the page load time.

In a feature of the present disclosure, the method and apparatus compute page load times of objects associated with a webpage to be visited next and request those objects with long page load times first when the webpage is visited. Hence, it is possible to reduce the overall page load time.

Hereinabove, various embodiments of the present disclosure have been shown and described for the purpose of illustration without limiting the subject matter of the present disclosure. It should be understood by those skilled in the art that many variations and modifications of the method and apparatus described herein will still fall within the spirit and scope of the present disclosure as defined in the appended claims and their equivalents.

What is claimed is:

1. A method for page loading in a mobile terminal, the method comprising:
    selecting, when a page is visited, a candidate page to be pre-inspected with respect to the page;
    performing pre-inspection of the candidate page and determining types of objects associated with the candidate page;
    generating tree information for the candidate page based on the determination result; and
    computing a loading time of the candidate page based on the tree information and determining download priorities of objects that are to be downloaded when the candidate page is visited.

2. The method of claim 1, wherein selecting a candidate page to be pre-inspected comprises selecting a candidate page based on at least one of usage histories related to web access, user interactions, required terminal resources, network resource usage estimates, information on the connected network, an amount of traffic on a connected network, billing information for a connected network, and billing information of a domain to be pre-inspected.

3. The method of claim 1, wherein selecting a candidate page to be pre-inspected further comprises identifying objects associated with the candidate page, and wherein the objects correspond to at least one of HyperText Markup Language (HTML), image, JavaScript, and Cascading Style Sheet (CSS).

4. The method of claim 1, wherein determining types of objects further comprises:

sending, when an object is of type 1, an HTTP GET request for the object and downloading the object corresponding to the request; and sending, when an object is of type 2, an HTTP HEAD request and receiving size information of the object corresponding to the request.

5. The method of claim 4, wherein a type 1 object includes at least one of an HTML and CSS object, and a type 2 object includes an image object.

6. The method of claim 1, wherein determining download priorities of objects comprises assigning download priorities so that an object with a large size is downloaded first.

7. The method of claim 1, wherein determining download priorities of objects comprises assigning download priorities so that an object with a large download delay is downloaded first.

8. A mobile terminal for loading pages, the mobile terminal comprising:

an interface unit accesses a page, and sends and receives signals to and from the page; and a pre-inspector performs a process of selecting, when a page is visited, a candidate page to be pre-inspected with respect to the page, performing pre-inspection of the candidate page and determining types of objects associated with the candidate page, generating tree information for the candidate page based on a result of the determination, and computing a loading time of the candidate page based on the tree information and determines download priorities of objects that are to be downloaded when the candidate page is visited.

9. The mobile terminal of claim 8, wherein the pre-inspector selects a candidate page based on at least one of usage histories related to web access, user interactions, required terminal resources, network resource usage estimates, information on a connected network, an amount of traffic on a connected network, billing information for a connected network, and billing information of a domain to be pre-inspected.

10. The mobile terminal of claim 8, wherein the pre-inspector identifies objects associated with the candidate page, and wherein the objects correspond to at least one of HyperText Markup Language (HTML), image, JavaScript, and Cascading Style Sheet (CSS).

11. The mobile terminal of claim 8, wherein the pre-inspector controls a process of sending, when an object is of type 1, an HTTP GET request for the object and downloads the object corresponding to the request, and sends, when an object is of type 2, an HTTP HEAD request and receives size information of the object corresponding to the request.

12. The mobile terminal of claim 11, wherein a type 1 object includes at least one of an HTML and CSS object, and a type 2 object includes an image object.

13. The mobile terminal of claim 8, wherein the pre-inspector assigns download priorities so that an object with a large size is downloaded first.

14. The mobile terminal of claim 8, wherein the pre-inspector assigns download priorities so that an object with a large download delay is downloaded first.

* * * * *